United States Patent

Reynolds et al.

[11] Patent Number: 5,828,052
[45] Date of Patent: Oct. 27, 1998

[54] ERGONOMETRIC MODULAR HAND-HELD SCANNER, INCLUDING AN ERGONOMIC HANDLE AND HILT

[75] Inventors: Andrew E. Reynolds, Bothell; James R. Stewart, Woodinville, both of Wash.; Kenneth D. Wood, Woodside; David W. Laituri, Palo Alto, both of Calif.; Nancy Hafermann, Mercer Island, Wash.; Pat Rodden, Snohomish, Wash.; Eric Hassenzahl; Matt Pedersen, both of Seattle, Wash.

[73] Assignee: Intermec Corporation, Everett, Wash.

[21] Appl. No.: 735,664

[22] Filed: Oct. 24, 1996

[51] Int. Cl.[6] .................................................. G06K 7/10
[52] U.S. Cl. ........................................ 235/472; 235/454
[58] Field of Search ..................................... 235/472, 454, 235/462; 250/234, 235, 236, 239; 361/728, 814; 294/25

[56] References Cited

U.S. PATENT DOCUMENTS

| | | | |
|---|---|---|---|
| D. 387,753 | 12/1997 | Stewart et al. | D14/116 |
| D. 387,754 | 12/1997 | Stewart et al. | D14/116 |
| 4,165,554 | 8/1979 | Faget | 294/25 X |
| 4,825,057 | 4/1989 | Swartz et al. | 235/472 |
| 4,935,610 | 6/1990 | Wike, Jr. | 235/472 |
| 4,983,818 | 1/1991 | Knowles | 235/472 |
| 5,092,793 | 3/1992 | Stephan | 235/472 X |
| 5,198,650 | 3/1993 | Wike, Jr. | 235/472 |
| 5,349,497 | 9/1994 | Hanson et al. | 235/472 X |
| 5,378,882 | 1/1995 | Gong et al. | 235/472 |
| 5,410,141 | 4/1995 | Koenck et al. | 235/472 |
| 5,477,044 | 12/1995 | Aragon | 235/472 |
| 5,539,193 | 7/1996 | Gibbs et al. | 235/472 |
| 5,539,194 | 7/1996 | Miller et al. | 235/472 |
| 5,541,397 | 7/1996 | Walts | 235/472 |
| 5,572,007 | 11/1996 | Aragon et al. | 235/472 |
| 5,576,530 | 11/1996 | Hagerty | 235/472 |
| 5,576,531 | 11/1996 | Murphy | 235/472 |
| 5,591,953 | 1/1997 | Rockstein et al. | 235/472 X |
| 5,668,364 | 9/1997 | Swartz et al. | 235/472 |

FOREIGN PATENT DOCUMENTS

| | | |
|---|---|---|
| 0-498-366-A2 | 8/1992 | European Pat. Off. . |
| 2-144681 | 6/1990 | Japan . |
| 4-149790 | 5/1992 | Japan . |
| 92/15073 | 9/1992 | WIPO . |

OTHER PUBLICATIONS

1565 Bar Code Laser Scanner With Display and Keypad, Product Brochure, Intermec Corporation, Jun. 1993.

1545 Bar Code Laser Scanner, Product Brochure, Intermec Corporation, Mar. 1993.

1585 Advanced Long–Range Scanner and 1586 High–Visibility Scanner, Product Brochure, Intermec Corporation, Oct. 1991.

1620 Bar Code Laser Scanner, Product Brochure, Intermec Corporation, May, 1991.

1515 Visible Laser Diode Bar Code Scanner, Product Brochure, Intermec Corporation, May, 1991.

1461 Charge–Coupled Device Scanner, Product Brochure, Intermec Corporation, April, 1991.

1621 Laser Scanner for Very High Density Bar Code, Product Brochure, Intermec Corporation, Feb., 1991.

*Primary Examiner*—Donald T. Hajec
*Assistant Examiner*—Michael G. Lee
*Attorney, Agent, or Firm*—Seed and Berry LLP

[57] ABSTRACT

A hand-held scanner has a head containing scanning components, a hilt position between the head and a handle that is sized and shaped to rest against an upper surface of a users thumb and index finger. An endcap is secured to a free end of the handle that has a circumferentially and outwardly extending bumper, which, together with the hilt, protect the scanner from impact and dropage. A trigger extending outwardly from the handle, extends a significant distance forward of the handle to provide a tactile queue for users to blindly grip the handle and position an index finger on the trigger. The handle preferably has a tubular, seamless shape to avoid irritation with a users hand when gripped. A window in the head is recessed and angled to inhibit damage and contact with foreign objects.

34 Claims, 9 Drawing Sheets

ERGONOMETRIC MODULAR HAND-HELD SCANNER, INCLUDING AN ERGONOMIC HANDLE AND HILT

TECHNICAL FIELD

This invention relates to hand-held scanners for scanning barcodes, characters and the like and, more particularly, to an ergonometrically designed scanner.

BACKGROUND OF THE INVENTION

Hand-held scanners for barcodes are a well-established fixture in modern life. Virtually every retail point-of-sale employs a scanner of some kind to automatically read the barcode on products which contains the "SKU" number by which inventory control and pricing is maintained in the establishment's computer.

Contemporary, prior art, hand-held scanners are typically constructed in the manner depicted in simplified form in FIG. 1. The scanner 10 comprises a body of plastic having a head portion 12 and a handle portion 14. As depicted in FIG. 2, the head portion 12 typically has a window opening 16 in the front through which a scanning light beam is directed and reflected back from the barcode to be read by electronics (not shown) within the head portion 12.

The prior art scanner construction of FIG. 1 can be tiring to hold for any extended length of time. Also, the design is such that specific action must be taken to point the window opening 16 in the direction of the barcode to be scanned. That is, pointing is not intuitive when the scanner 10 is held.

Moreover, if any modifications are made to the internal elements, a new body, i.e., head portion 12 and handle portion 14, must be designed and manufactured. Even simple changes like a new connecting cord design can require a whole new body. Also, the all-plastic construction makes the scanner more prone to damage from accidental dropping or the like.

Furthermore, to seal the window opening 16 from moisture and dust entry into the head portion 12, a clear plastic window 18 is positioned in the window opening 12 where it is peripherally sealed by a gasket 19. This, of course, adds to the complexity and cost of manufacture.

Wherefore, it is an object of this invention to provide a hand-held scanner body which is ergonometrically designed for ease and comfort of holding even over extended periods It is another object of this invention to provide a hand-held scanner body which is modular in construction so that changes can be effected by simply changing one or more modules.

It is still another object of this invention to provide a hand-held scanner body and method of manufacture which is resistive to breakage and more comfortable to hold.

It is yet another object of this invention to provide a hand-held scanner body and method of manufacture which results in the elimination of the gasket around the window opening.

It is a further object of this invention to provide a hand-held scanner body whose pointing is fairly intuitive an natural.

Other objects and benefits of this invention will become apparent from the following description when read in conjunction with the accompanying drawing Figures.

SUMMARY OF THE INVENTION

The foregoing objects have been attained in a hand-held scanner having a head containing the scanning components, a hilt positioned between the head and the handle for one's hand to comfortably rest against. The handle portion of the scanner is sized for gripping by a range of hand sizes and an endcap over the bottom of the handle to enhance the security of the user's grip. The scanner is ergonomically, having a body for ease and comfort in holding and where pointing the scanner is fairly intuitive and natural. The scanner is of a modular construction so that changes can be effected by simply changing one or more of the modules.

In a broad sense, the present invention embodies a scanner for scanning visual images. The scanner includes scanning circuitry, a head unit, an elongated handle and a hilt. The scanning circuitry scans and converts the visual images to signals. The head unit receives at least a portion of the scanning circuitry therein and has upper, lower, forward, and rear portions. The elongated handle extends downwardly from the head unit, where the handle is sized and shaped to fit within a user's hand. The hilt is coupled between the lower portion of the head unit and an upper portion of the handle. The hilt extends outwardly beyond at least the rear portion of the head unit and is sized to rest on an upper portion of a user's thumb and index finger.

The present invention also embodies the scanner, which includes an endcap coupled to a free end of the handle. The endcap has an outwardly and circumferentially elastomeric portion. The present invention also embodies a head unit that receives at least a portion of the scanning circuitry therein, wherein the scanning circuitry emits a scanning beam from a forward portion of the head unit in an increasingly widening plane. A rear portion of either the head unit or the hilt tapers to a rearwardly facing tapered end. The head unit includes a visual indicator positioned at an upper surface of the head unit, close to a forward portion and at an approximate center of the plane, and aligned with the tapered end.

DETAILED DESCRIPTION OF THE INVENTION

Figure 1:
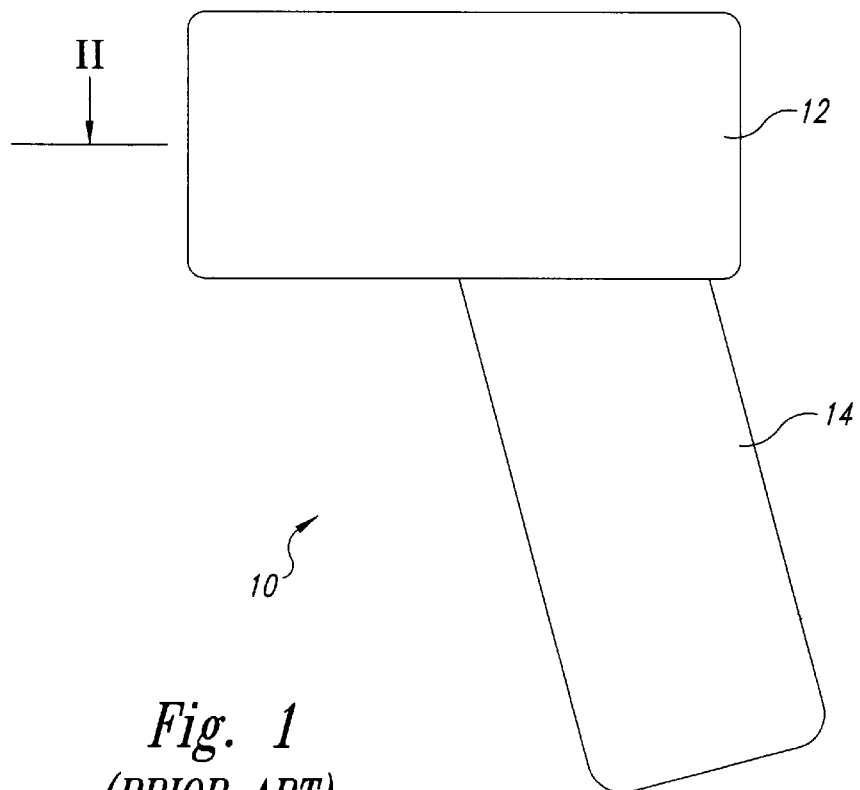
FIG. 1 is a simplified, side-view drawing of a prior art hand-held scanner.
Figure 2:
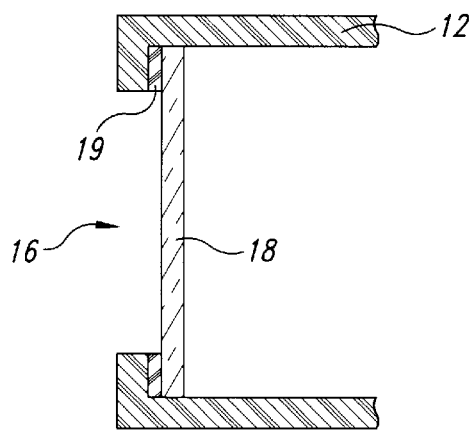
FIG. 2 is an enlarged, cutaway, simplified drawing of the front window portion of the scanner of FIG. 1, taken at line II of FIG. 1.
Figure 3:
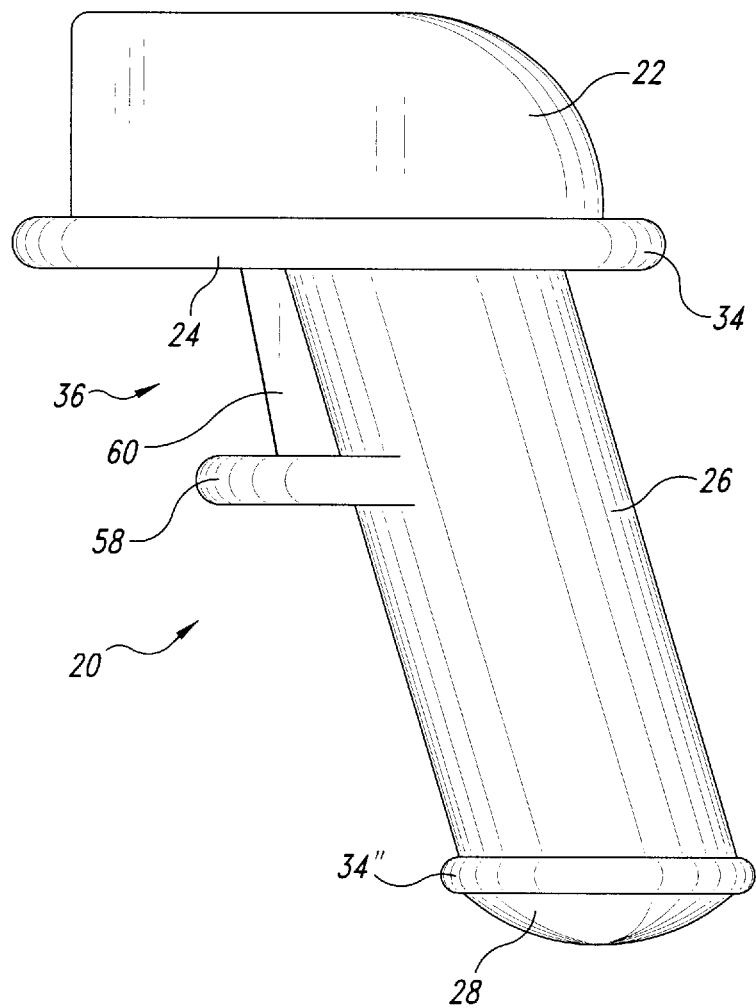
FIG. 3 is a simplified, side-view drawing of a hand-held scanner according to the present invention.
Figure 4:
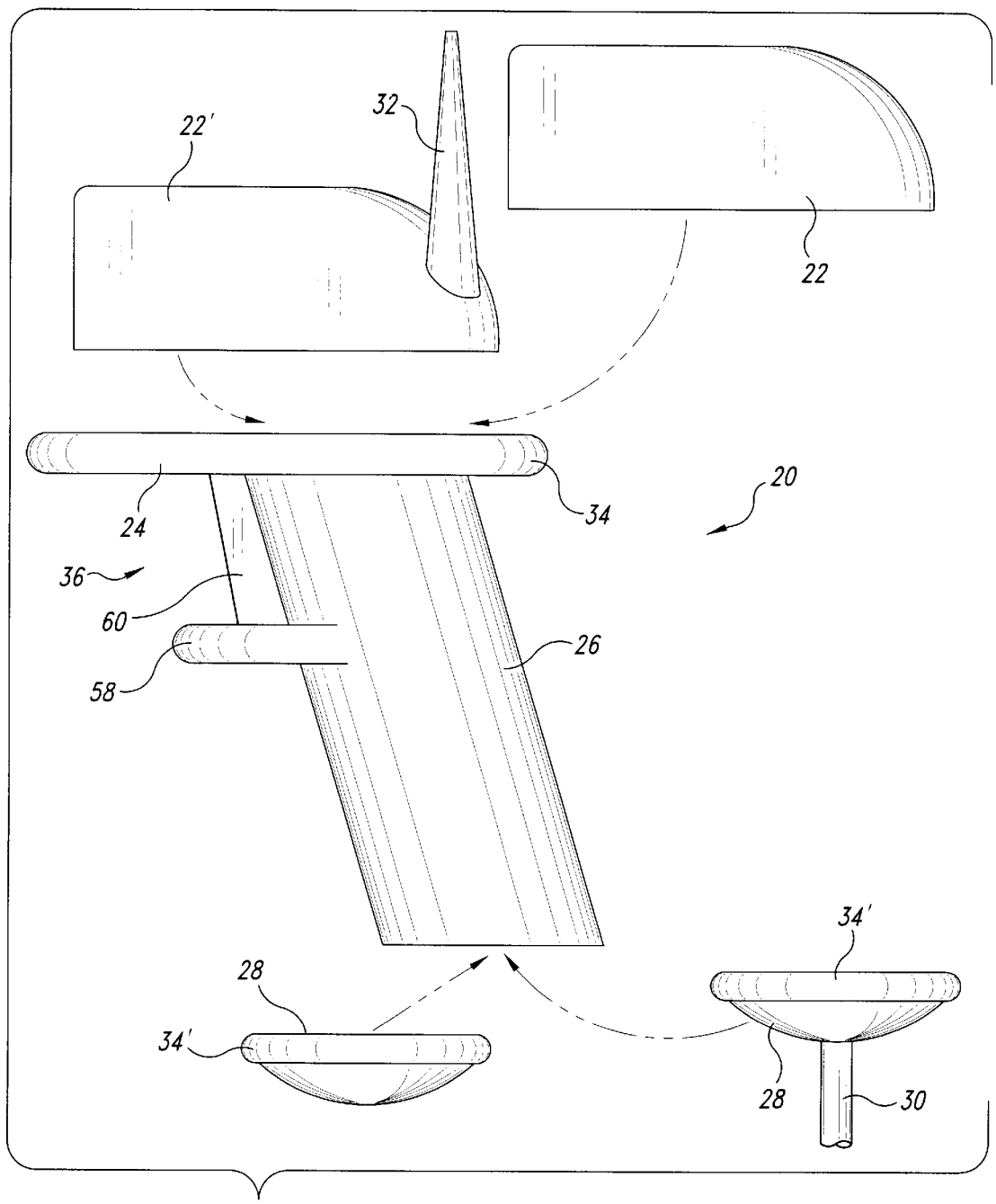
FIG. 4 is a simplified, exploded, side-view drawing of a hand-held scanner according to the present invention depicting how the modular construction can employ different modules for different functions.
Figure 5:
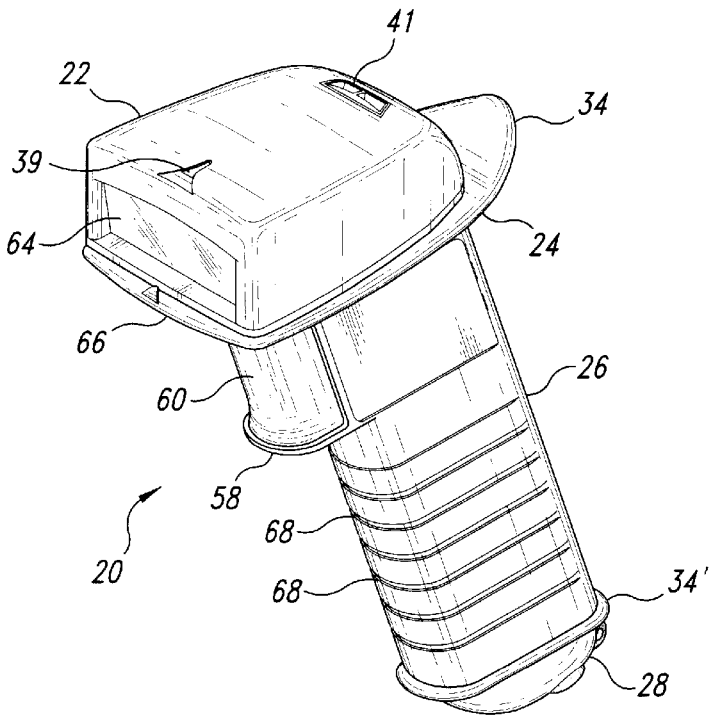
FIG. 5 is a more detailed, isometric view drawing of a hand-held scanner according to the present invention in a preferred embodiment with a cushioned outer surface.

A basic hand-scanner according to the present invention is shown in FIGS. 3 through 10 where it is generally indicated as 20. What is depicted therein is a basic design of an enclosure for a family of hand-held image scanning (barcode and other) devices. As shown in FIGS. 3 and 4, the scanner 20 is modular in construction and comprises four basic elements—a head 22, a hilt 24 removably secured to an underside of the head, a handle 26 extending downwardly and rearwardly of the hilt, and an endcap 28 removably secured to a free end of the handle. The head 22, hilt 24, handle 26, and endcap 28 are preferably individual modules each moveably securable together to form the scanner 20. The head 22, hilt 24, handle 26 and endcap 28 can be secured together using known means, such as screws, to permit mechanical assembly and disassembly.

This modularity allows for such features as removal of the head 22 for service access to a scan engine (not shown) contained therein; removal of the endcap 28 for replacement or reconfiguration of a cable assembly 30; and/or replacement of the head 22 with another head 22 having different physical details required for different scan engines or to include an antenna 32, or the like, for cordless operation. Additionally, such modularity of the scanner 20 can reduce the number of "spare" scanners that a user may require. Defective, or alternate, modules can be replaced with existing scanners to provide an appropriate scanner for each application, and to repair a given scanner. For example, a head 22 having a long range scanner therein can be replaced with a head having a CCD-type imager. Alternatively, if circuitry in a given head 22 is defective, a substitute head can be used to replace it, rather than replacing the entire scanner 20.

A variety of products can be configured with the modular "standard enclosure" of FIGS. 3 and 4. As will be readily understood from the detailed description herein, products or technical components that require larger head volumes, different head shapes, or different surface-affecting details can be built quickly and easily by changing only those enclosure components requiring change. For example, should a cordless product be desired, the endcap 28 is replaceable along with a head 22' having the antenna 32. This modular design thus allows faster time to market and reduced tooling costs by separating the product into functionally logical modules that may be leveraged in future product development efforts.

The design is also intended, through its overall form, to support an intuitively proper usage posture; that is, to "feel natural" to the user during proper usage, as described herein. As well, upper and lower bumpers 34 and 34' (circumferentially formed around the hilt 24 and endcap 28, respectively) extend outwardly and are of elastomers to protect underlying surfaces of the scanner 20 vulnerable to damage during normal usage and drop (to be described in detail shortly). The upper and lower bumpers 34 and 34' also provide environmental protection by acting as a gasket between the head 22, hilt 24, handle 26 and endcap 28, thereby inhibiting contaminants from entering into the interior of the scanner 20. Having thus described the features of the present invention broadly, they will now be addressed in greater detail.

Referring to FIGS. 5 through 9, the scanner 20 of this invention has an ergonomic shape which is both easier to hold for prolonged periods and with which pointing is fairly intuitive and natural. Directly above the normal grip area 36, the hilt 24 of the scanner 20 has an outwardly extending shape and is sized such that it will rest, without excessive grip force, comfortably and securely on the top surfaces of the thumb and index finger when the user's hand is the normal "pistol grip" or "handshake" end-use posture around the handle 26, with the index and second finger in the correct position for trigger actuation. As a result, the user need not grip the handle 26 tightly, while holding the scanner 20, since the hilt 24 helps maintain the scanner in the user's hand. The hilt 24 extends approximately 360° around the upper end of the handle 26, to thereby rest on nearly all of the upper surfaces of the thumb and index finger, and the web portion of the hand formed therebetween. Additionally, the scanner 20 is preferably lightweight so as to further minimize the gripping force needed by the user to hold the scanner.

In the preferred embodiment, a trigger guard 58 formed into the handle 26 extends outwardly from under a trigger 60 of a switch 48 (FIG. 10) to prevent accidental actuation of the switch. The trigger guard 58 can also carry part of the weight of the scanner 20 on the top of the user's middle or ring finger thereby allowing more freedom of movement and comfort for the user's index finger. As a result of the trigger guard 58 and the hilt 24, a user need not employ excessive grip force to comfortably hold the scanner 20.

The trigger 60 is large and broad, having a large vertically extending surface. As a result, users may readily locate the trigger 60 with an index finger. Additionally, the large trigger 60 inhibits the index finger from being pinched between the trigger and the handle 26.

The scanner 20 has a symmetrical design that allows for equally comfortable use both by left-handed and right-handed users. The handle 26 projects downwardly and rearwardly, at an obtuse angle with respect to the head 22 so that when the handle is gripped by a users hand, the head is positioned approximately perpendicular to the users fist. The handle 26 is preferably angled at 15° with respect to the perpendicular from the hilt 24. As a result, a user may more readily aim the scanner 20 in a position perpendicular to the user when held at approximately chest height.

The handle 26 is formed and detailed to provide comfortable and secure gripping by a range of hand sizes and under a range of environmental conditions. The handle 26 has a generally oval or elliptical shape to comfortably fit within the hand of a user. The handle 26 has a cross-sectional area formed by two circles having 1-inch diameters, with a 1-inch distance between the centers of the circles, to thereby provide two semicircles positioned at opposite short ends of a rectangular area. Optional horizontal, circumferentially extending grooves 68 and the circumferential protrusion of the lower bumper 34' at the joining of the handle 26 and the endcap 28 enhance the security of a user's grip. In addition, the handle 26 is designed such that there are no assembly joints, seams, or parting lines against the surface of the user's hand during operation, thereby enhancing comfort and reducing the potential for abrasion and irritation of the skin. Indeed, the circumferentially extending grooves 68 do not extend completely around the handle 26, but stop at a rear side of the handle, so as not to irritate a web of skin between the thumb and forefinger. If desired, the handle 26 can be formed using a two-step process described below so that its surface is of a soft elastomeric material.

The hilt 24 has an up-turning rear-facing portion 38 that not only provides an aesthetically pleasing design, but allows easier vertical positioning or "aiming" of the scanner 20 while simultaneously reducing the amount of direct contact between the device and the sensitive "crotch" or webbing of skin between the thumb and index finger. The rear-facing portion 38 turns upward at an angle preferably about 35°. As a result, the rear-facing portion 38 minimizes the opportunity for abrasion and irritation of the hand. The rear-facing portion 38 of the hilt 24 provides for improved positioning or aiming of the scanner 20 by providing a rearwardly facing point that aligns with a similar centrally positioned indicia or indentation 39 formed in a top forward portion of the head 22. Overall, the construction of the scanner 20 is ergonomically optimal, as it reduces strains on the hands that can be caused by extension or flexion of the arms and hands or pronation of the forearms to adjust the position of the reader during scanning.

As shown in FIGS. 5 through 9, the shape of the head 22, when the handle 26 is gripped naturally in the hand, mimics and approximates the shape and boundaries of the scan beam being emitted, thereby providing visual clues to the user for more accurate first time target acquisition. In essence, the rear portion 38 of the hilt 24, together with the rearwardly pointed head 22, form a cone that opens toward the front portion of the head 22 to approximate the outwardly extending beams of the scanner to provide to a user the angle of horizontal divergence between the scan lines. Thus, aiming of the scanner 20 is both intuitive and natural. The head 22 has a low profile that minimizes visual obstruction between the user and a target.

A visual indicator 37, such as one or more LEDs, and an audio indicator 41 are located at the top, rearwardly facing portion of the head 22 for optimum user recognition without requiring direct viewing/listening. The visual indicator 37 preferably includes a power on LED (e.g., yellow) and an acceptable read/decode LED (e.g., green). The audio indicator 41 preferably consists of two small rearwardly and upwardly projecting cones that channel sound back toward the user. People tend to hold a scanner at approximately chest height, significantly lower than the height of the user's ears. As a result, the audio indicator 41 preferably directs the sound not only rearwardly, but also upwardly.

Figure 7:
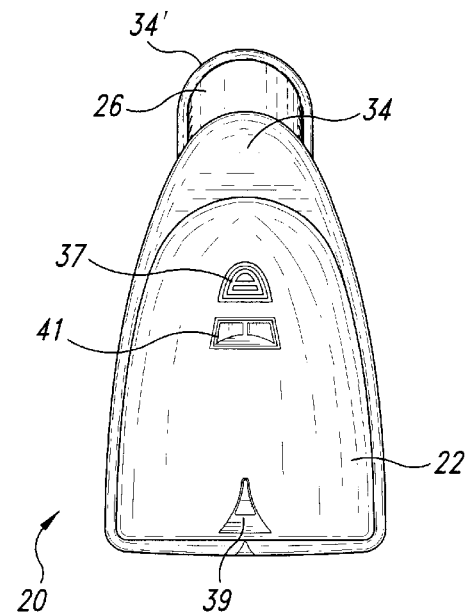
FIG. 7 is a top view drawing of the hand-held scanner of FIG. 5.
Figures 8, 9:
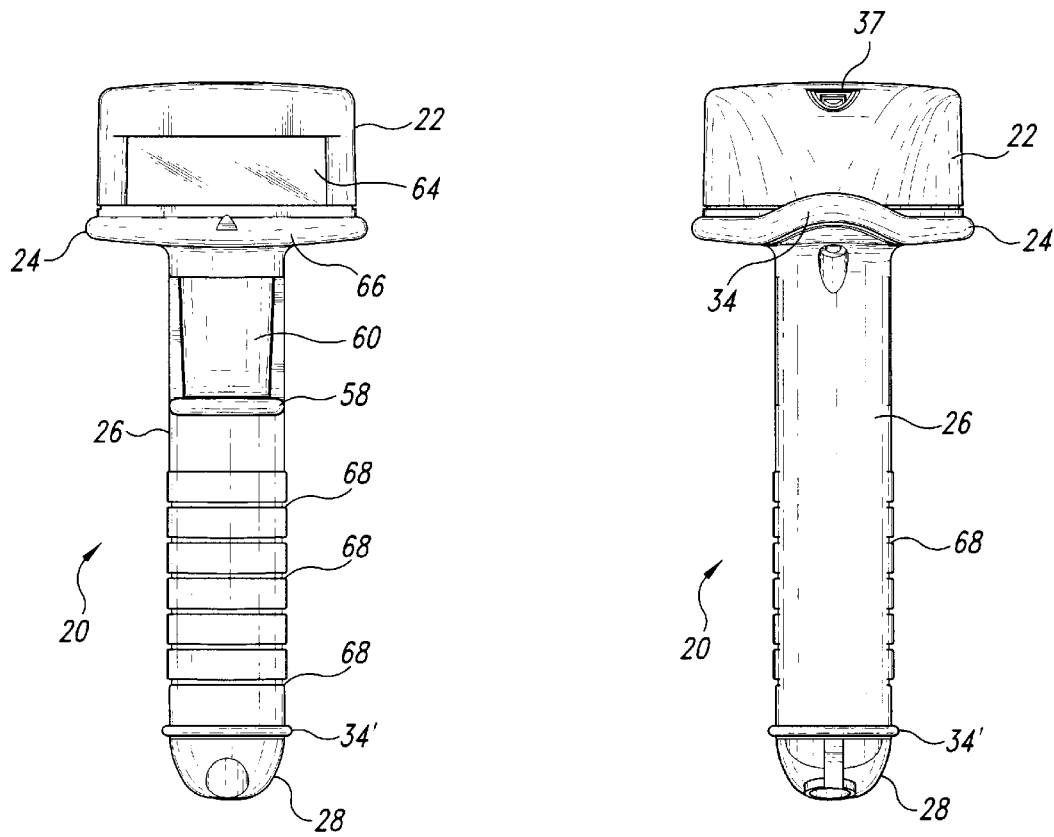
FIG. 8 is a front view drawing of the hand-held scanner of FIG. 5.
FIG. 9 is a rear view drawing of the hand-held scanner of FIG. 5.

In a preferred method of manufacture depicted in FIGS. 7 and 8, the head 22 is made using a two-shot injection molding technique. A solid thermoplastic resin "first-shot" part 40 is injected into a first mold 42 (FIG. 7) that includes specific precision requiring mechanical features to be permanently bonded to an elastomeric "second-shot" part 44 injected in a second mold 46 (FIG. 8). The first part 40 is preferably formed of a polycarbonate ABS blend, such as Cycoloy™, while the second part 44 preferably has an approximately 15% lower durameter rating than the first part, such as a PVC or urathane elastomer. The first and second parts 40 and 44 are preferably of materials that permit chemical bonding therebetween. Alternatively, the first and second parts 40 and 42 can be of materials that do not chemically bond therebetween, but where the first part includes holes, dovetailing, or other known molding techniques so that the second part 44, when formed around the first part, mechanically secure thereto. The second shot includes exterior features that provide environmental protection from shock and moisture.

As a result, the first part 40 in the first molding 42 provides structural integrity and defines features and shapes of the first part, while the second part 44 provides an exterior elastomeric covering that provides an environmental seals for the part, a frictional surface to prevent the part from sliding off inclined surfaces, and a surface capable of absorbing shock that can at times be applied to the reader 20. As a result, the head 22, hilt 24 and endcap 28 are preferably formed under the two-shot injection molding technique. The hilt 24 and handle 26 are preferably formed together, although the hilt 24 can be formed as a piece separate from the handle 26. The handle 26 preferably extends outwardly to form the hilt 24 as the first part 40, while the second part forms an upper surface that curves around the periphery thereof to join the second part at the lower surface.

The endcap 28 also includes a shape accomplished in the two-shot molding process that forms the lower bumper 34'. During drop and during normal placing of the unit on a work surface during non-use, the lower bumper 34' absorbs shock. In addition, the combination of the upper bumper 34 of the elastomer-covered hilt 24 and the elastomer-covered lower bumper 34' on the endcap increase the surface friction of the unit when placed on a work surface, thus reducing any tendency to slide or be pulled by the weight of a non-supported cable. As described above, the elastomer of the second shot 44 is used to provide part of the environmental sealing of the unit. Therefore, the lower bumper 34' forms an environmental seal between the end cap 28 and the handle 26.

Thus, the hilt 24 and endcap 28 are shaped and formed such that they perform as shock-absorbing peripheral bumpers during primary drop attitudes. An additional benefit and feature of the hilt 24 is found in the use of the elastomeric component of the two-shot molding to provide a portion of a window seal, where the inside of the head 22 forms the rest of the seal. As shown in the cross section view of FIG. 10, the hilt 24 is formed with a groove 62 formed therein, while the inside front portion of the head 22 has similar grooves 62 formed therein. Such grooves 62 and 62' extend within the elastomeric second part 44 of the hilt 24 and head 22. As a result, a window 64 can be securely received within the grooves 62 and 62' without the need for additional gasketing as required in the prior art construction described above.

Figure 10:
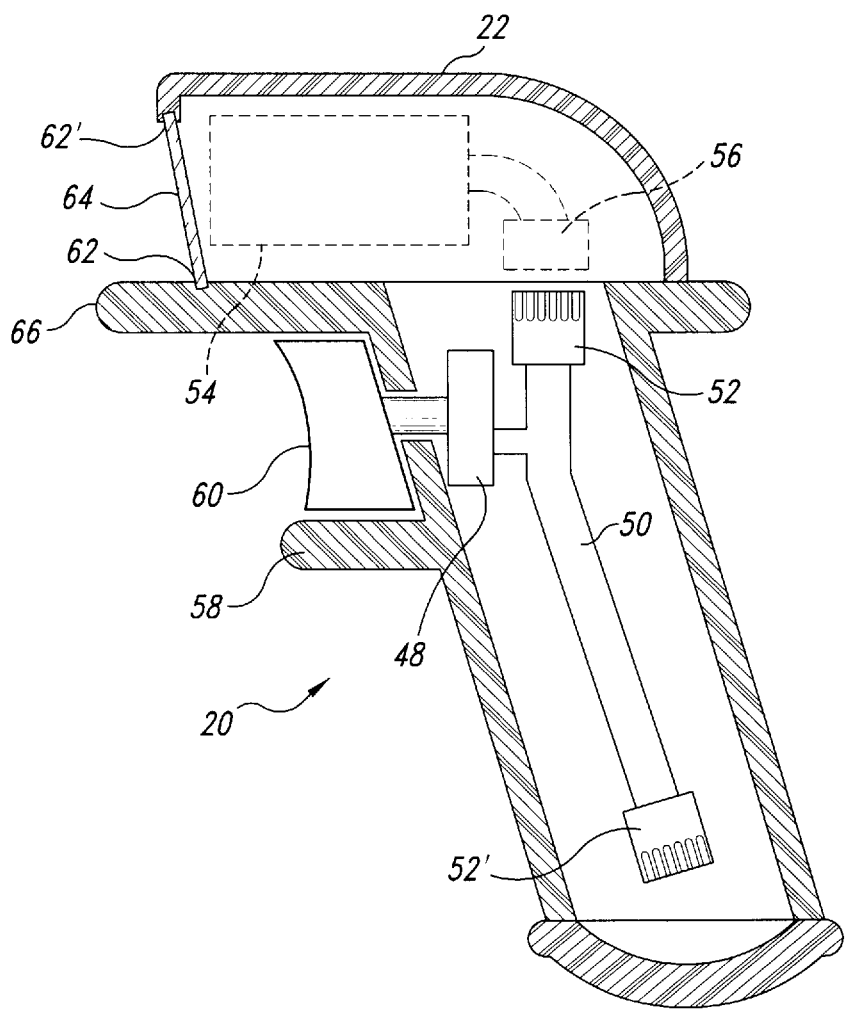
FIG. 10 is a simplified, cutaway, side-view drawing of the scanner of FIG. 4 showing a window and the plug-connectable aspects of the modules thereof.
Figure 11:
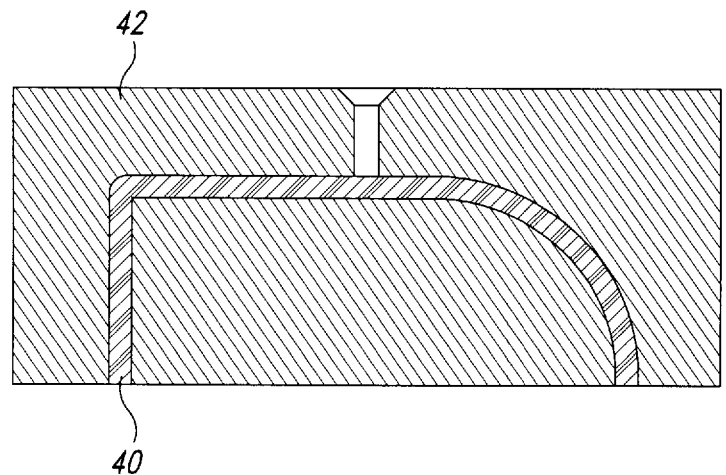
FIG. 11 is a simplified, cutaway, side-view drawing of a first mold used to construct modules of a preferred scanner according to the present invention.
Figure 12:
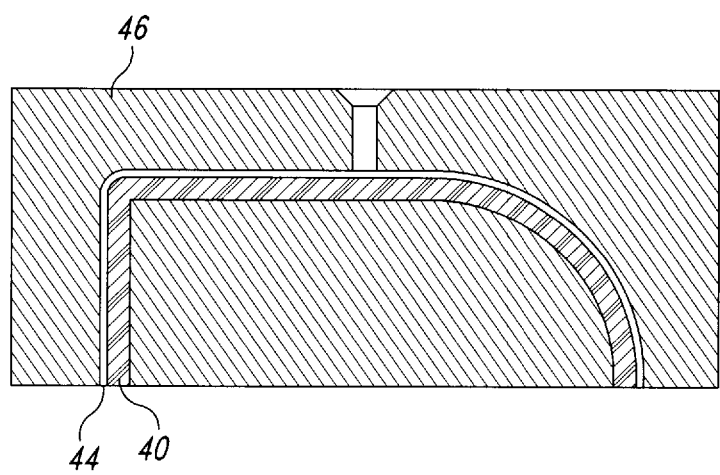
FIG. 12 is a simplified, cutaway, side-view drawing of a second mold used to construct modules of a preferred scanner according to the present invention.

As shown in FIG. 10, the window 64 angles rearwardly from its top to its bottom portion. By providing such a downwardly angled surface, the window 64 resists the collection of dust, as opposed to windows that are perpendicular or that angle forward. Moreover, the window 64 is recessed slightly within the head 22. Such recessing of the window 64, together with a forwardly extending portion 66 of the hilt 24, act to protect or guard the window from scratches. The window 64 is preferably of an optically transparent, yet hard, surface that further resists scratching.

Figure 6:
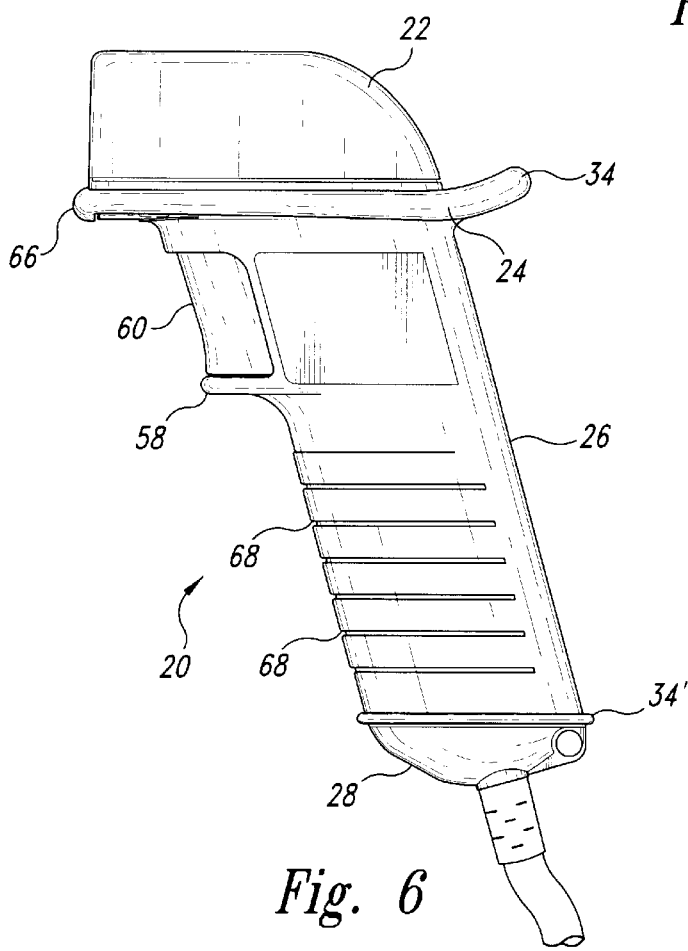
FIG. 6 is a side-view drawing of the hand-held scanner of FIG. 5.

In general, interior details of the scanner 20 are accomplished in the usual manner for such devices to provide accurate assembly and necessary support for internal components. Referring to FIG. 6, the handle 26 in its preferred embodiment is provided with an integral trigger-actuated switch 48 connected to an internal ribbon conductor 50 extending between a head plug connector 52 on the head end and an end plug connector 52' on the endcap end. Internal components shown ghosted as 54 located within the head 22 can thus be easily connected and disconnected to the head connector 52 using a mating plug and connecting cable assembly 56 included as part thereof. Likewise, the end connector 52' can couple to a endcap 28' (FIG. 4) having a cable attached thereto, to allow the scanner 22 to coupled to external electronics such as a computer (not shown). Alternatively, a battery pack, or other electronics (not shown), can couple to the reader 20 by means of the end connector 52'.

Figure 13:
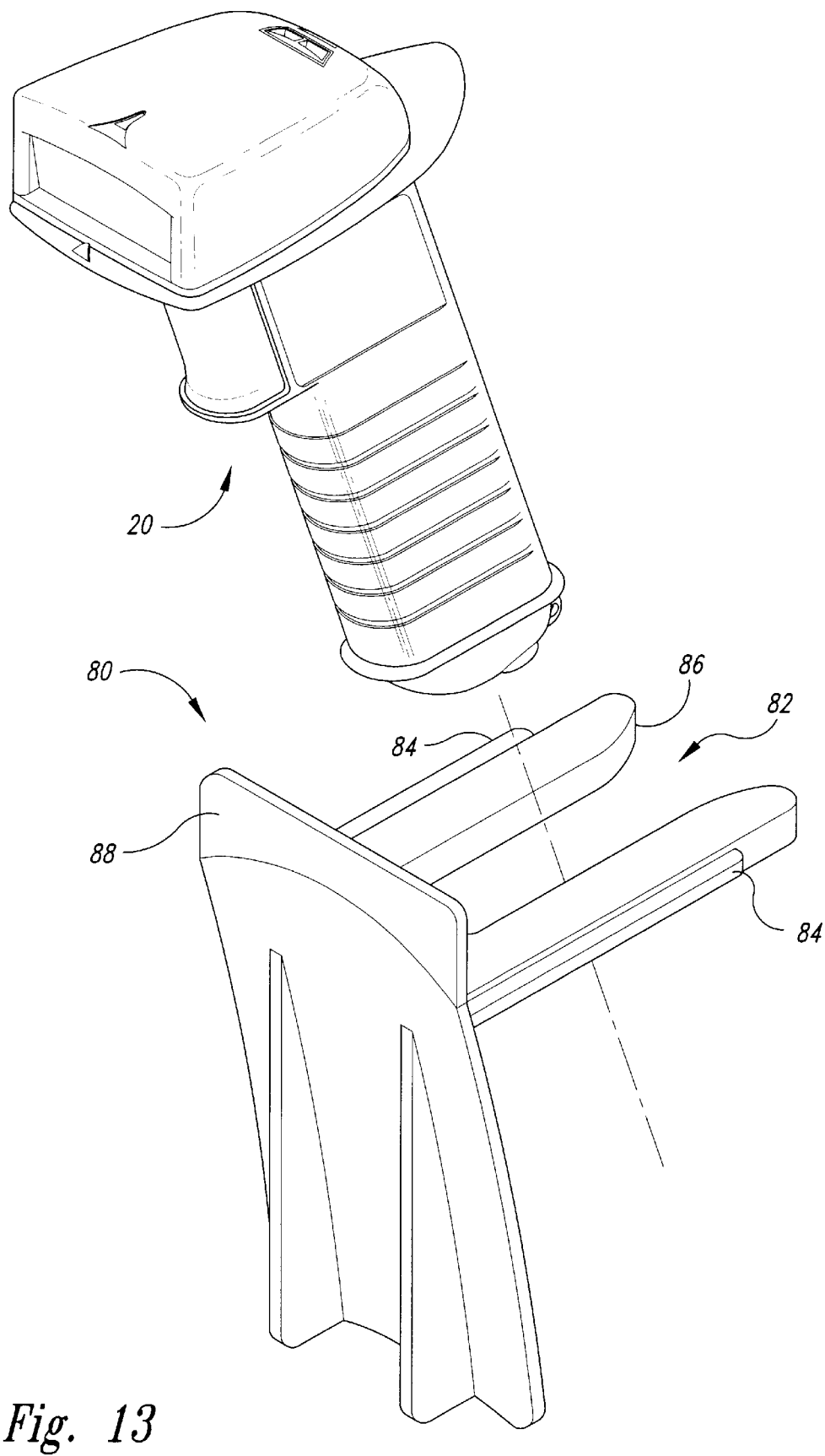
FIG. 13 is an isometric view of a wall mount unit for use with the hand-held scanner of FIG. 5.

Referring to FIG. 13, a wall mount 80 for removably holding the scanner 20 is shown. The wall mount 80 includes a U-shaped opening 82 formed by a pair of outwardly extending fingers 84 and an elastomeric gasket 86 extending within the opening 82 and on an upper surface of the fingers 84. A rear surface 88 of the wall mount 80 can be secured to a wall, vehicle or other surface, while the undersurface of the hilt 24 of the scanner 20 rests on an upper surface of the gasket 86, with the handle 26 extending through the 82.

Figure 14:
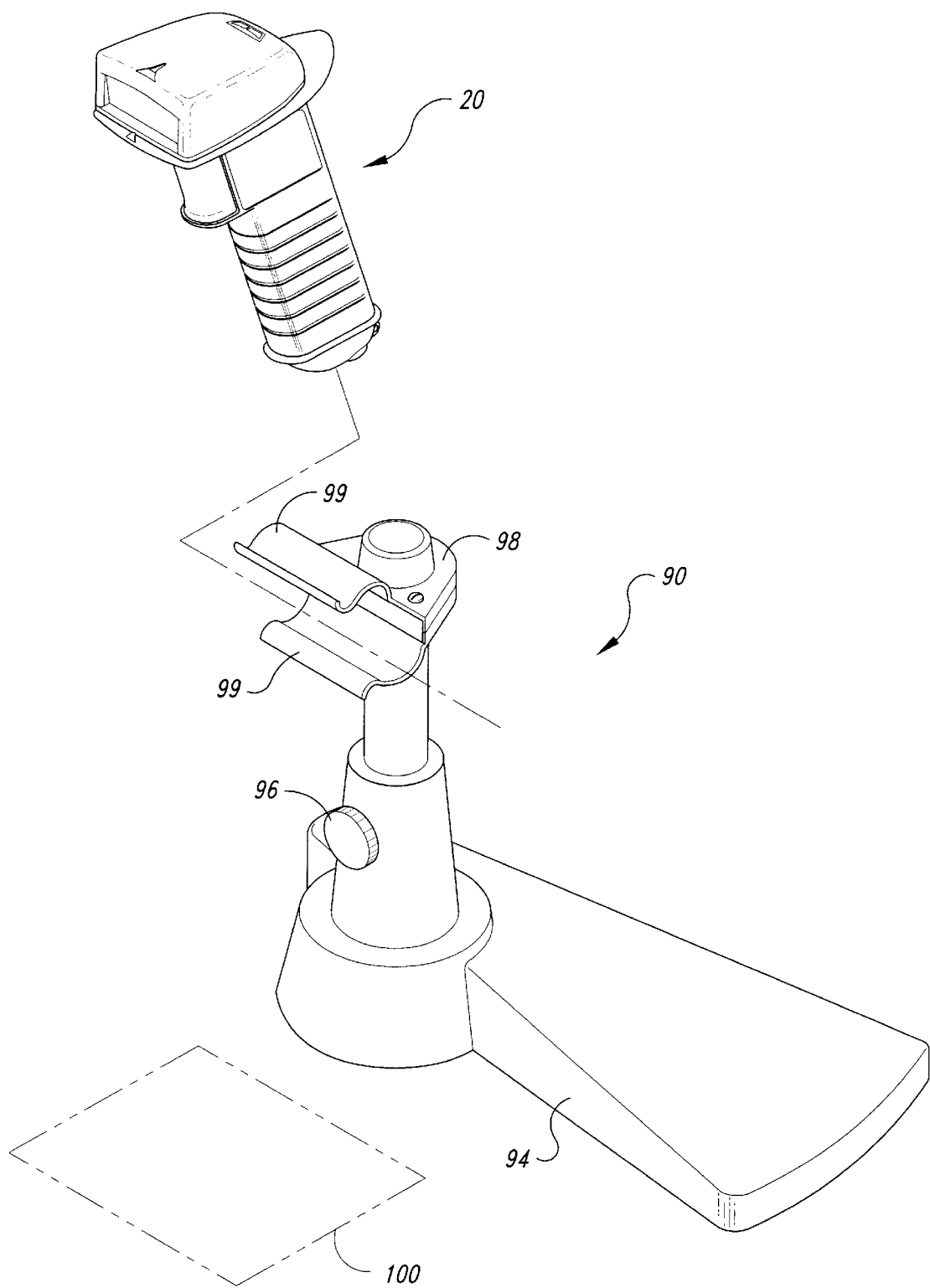
FIG. 14 is an isometric view of a document stand unit for use with the hand-held scanner of FIG. 5.

Referring to FIG. 14, a document stand 90 includes a telescoping shaft 92 extending from a base 94. An adjustment knob 96 allows the shaft 92 to be adjustably positioned above a work surface on which the base 94 rests. A clamp 98 positioned at a free end of the shaft 92 includes a pair of elongated fingers 99, each having an S-shaped cross section, to form an overall C-shaped cross section that receives the handle 26. The fingers 99 of the clamp 98 releasably secure the handle 26 of the scanner 20 above the work surface. In such a configuration, the window 64 of the scanner 20 is oriented downward toward the work surface, so that the scanner can image or scan a document 100. The shaft 92 and/or clamp 98 are preferably rotatable with respect to the base 94. As a result, the scanner 20 can be modified from being a hand-held unit to being a "fixed" location scanner.

Although specific embodiments of, and examples for, the present invention are described herein for illustrative purposes, various equivalent modifications can be made without departing from the spirit and scope of the invention, as will be known by those skilled in the relevant art. For example, while the present invention has been generally described above as providing a scanner having each of the various inventive elements, a scanner can incorporate only one of such elements therein. A scanner can include, for example, only the hilt 24 and its associated features, while omitting other features, such as the large trigger 60 and outwardly extending trigger guard 58, modular head unit 22, etc. These and other changes can be made to the invention in light of the detailed description provided herein. In general, in the following claims, the terms used should not be construed to limit the invention to the specific embodiments disclosed in the specification and the claims, but should be construed to include any hand-held imaging system having the features provided in accordance with the claims. Accordingly, the invention is not limited by the disclosure, but instead its scope is to be determined entirely by the following claims.

We claim:

1. An ergonomic body for a hand-held scanner, comprising:
    a hollow head portion for holding scanning components, the head portion having a longitudinal axis and a first width in a direction transverse to the longitudinal axis;
    a handle portion sized for gripping by a user's hand, said handle portion having a second width in a direction transverse to the longitudinal axis of the head portion, the second width being less than the first width, and the handle portion having a top end connected to said head portion and a bottom end;
    a hilt portion disposed between said head portion and said handle portion, said hilt having a third width that is greater than the first width and the hilt portion extending outward, perpendicularly to said handle portion in the direction transverse to the longitudinal axis of the head, the hilt portion having a lower surface positioned to sit upon a top portion of a user's hand holding said handle portion; and
    an endcap portion disposed over said bottom end of said handle portion.

2. The ergonomic body for a hand-held scanner of claim 1 wherein said handle portion is hollow and forms a conduit between said head portion and said endcap portion.

3. The ergonomic body for a hand-held scanner of claim 2 and additionally comprising a connector cable having plug connectors on ends thereof disposed within said conduit between said head portion and said endcap portion.

4. The ergonomic body for a hand-held scanner of claim 2 and additionally comprising a trigger switch carried by said handle portion at least partially in said conduit.

5. The ergonomic body for a hand-held scanner of claim 4 and additionally comprising a connector cable having plug connectors on ends thereof disposed within said conduit between said head portion and said endcap portion and connected to said trigger switch.

6. The ergonomic body for a hand-held scanner of claim 2 wherein the ergonomic body is of modular construction wherein said head portion, said handle portion, and said endcap portion are individual members and the head portion is removably connected to the hilt portion.

7. A scanner for scanning visual images, comprising:
    scanning circuitry that scans and converts the visual images to signals;
    a head unit that receives at least a portion of the scanning circuitry therein, the head unit having upper, lower, forward and rear portions and having a longitudinal axis extending between the forward and rear portions, the head unit having a first width in a direction transverse to the longitudinal axis;
    an elongated handle extending downwardly from the head unit, the handle having a second width in the direction transverse to the longitudinal axis of the head unit, the second width being less than the first width, the handle being sized and shaped to fit within a user's hand; and
    a hilt coupled between the lower portion of the head unit and an upper portion of the handle, the head unit being removably secured to the hilt, the hilt extending outwardly from the handle in the direction transverse to the longitudinal axis of the head unit, and the hilt extending outwardly from the handle beyond at least the rear portion of the head unit, and the hilt is sized to rest on an upper portion of a user's thumb and index finger.

8. The scanner of claim 7 wherein the hilt has an interior portion formed of a rigid material and an exterior portion formed of an elastomeric material.

9. The scanner of claim 7 wherein the hilt is at least partially formed of an elastomeric material extending along a periphery of the hilt.

10. The scanner of claim 7 wherein a rear portion of the hilt tapers to a rearwardly facing point, wherein the rear portion of the head unit tapers to a rearwardly facing end, and wherein the head unit includes a visual indication positioned at the upper surface of the head unit, close to the forward portion, and aligned with the point and end of the rearwardly facing portions of the hilt and head unit, respectively.

11. The scanner of claim 7 wherein a rear portion of the hilt extends upwardly to avoid resting on a web of skin between the user's thumb and index finger when the handle is grasped.

12. The scanner of claim 7 wherein the handle includes a substantially seamless tubular body.

13. The scanner of claim 7, further comprising a trigger movably mounted with respect to the handle and below the hilt, and wherein the handle includes a guard positioned below the trigger that extends outwardly beyond a forward surface of the trigger.

14. The scanner of claim 7, further comprising a window positioned within the forward portion of the head unit, wherein the hilt extends outwardly beyond the forward portion of the head unit in front of and below the window, and wherein the window angles downwardly and inwardly with respect to the head unit.

15. The scanner of claim 7, further comprising a window positioned within the forward portion of the head unit, wherein at least a part of the forward portion of the head unit and a forward portion of the hilt are formed of an elastomeric material and have downwardly and upwardly facing grooves formed therein, respectively, and wherein the window is securely received within the grooves to form an environmental seal between the window and an interior of the head unit.

16. The scanner of claim 7, further comprising an endcap coupled to a free end of the handle, the endcap having an outwardly and circumferentially extending elastomeric portion, and wherein the hilt and circumferentially extending elastomeric portion of the endcap define a gripping region on the handle.

17. A scanner for scanning visual images, comprising:

scanning circuitry that scans and converts the visual images to signals;

a head unit that receives at least a portion of the scanning circuitry therein, the head unit having upper, lower, forward and rear portions and having a first width;

an elongated handle extending downwardly from the head unit, the handle having a second width smaller than the first width of the head unit, the handle being sized and shaped to fit within a users hand;

a hilt integrally connected to the handle and positioned between the lower portion of the head unit and an upper portion of the handle, the hilt extending radially outwardly from the handle beyond the head unit and having a third width that is greater than the first and second widths, and the hilt is sized to rest on an upper portion of a user's thumb and index finger, and wherein the hilt and circumferentially extending elastomeric portion of the endcap define a gripping region on the handle; and an endcap coupled to a free end of the handle, the endcap having an outwardly and circumferentially extending elastomeric portion.

18. The scanner of claim 17 wherein the endcap is removably securable to the handle.

19. The scanner of claim 17 wherein the endcap includes an electrically conductive cable extending therefrom, the cable being electrically coupled to the scanning circuitry and receiving the signals therefrom.

20. The scanner of claim 17 wherein the handle includes a substantially seamless tubular body.

21. The scanner of claim 17, further comprising a trigger movably mounted to the handle and below the head unit, and wherein the handle includes a guard positioned below the trigger that extends outwardly beyond a forward surface of the trigger.

22. The scanner of claim 17, further comprising a document stand for releasably securing the elongated handle of the scanner and adjustably positioning the scanner above a work surface.

23. A scanner for scanning visual images, comprising:

scanning circuitry that scans and converts the visual images to signals;

a head unit that receives at least a portion of the scanning circuitry therein, the head unit having upper, lower, forward and rear portions, and wherein the scanning circuitry emits a scanning beam from the forward portion of the head unit in an increasingly widening plane;

an elongated handle extending downwardly from the head unit, the handle being sized and shaped to fit within a users hand; and a hilt coupled between the lower portion of the head unit and an upper portion of the handle and having a rear portion, wherein the rear portion of either the head unit or the hilt tapers to a rearwardly facing tapered end, and wherein the head unit includes a visual indication positioned at the upper surface of the head unit, close to the forward portion and at an approximate center of the plane, and aligned with the tapered end.

24. The scanner of claim 23 wherein the head unit is removably securable to the hilt.

25. The scanner of claim 23 wherein both the head unit and the hilt taper to rearwardly facing tapered ends.

26. The scanner of claim 23 wherein the wherein the rear portion of the hilt extends outwardly beyond at least the rear portion of the head unit and is sized to rest on an upper portion of a user's thumb and index finger when the handle is grasped.

27. The scanner of claim 23 wherein the handle includes a substantially seamless tubular body.

28. The scanner of claim 23, further comprising a trigger movably mounted to the handle and below the hilt, and wherein the handle includes a guard positioned below the trigger that extends outwardly beyond a forward surface of the trigger.

29. The scanner of claim 23, further comprising a window positioned within the forward portion of the head unit through which the scanning beam projects, and wherein the hilt extends outwardly beyond the forward portion of the head unit in front of and below the window.

30. The scanner of claim 23, further comprising a window positioned within the forward portion of the head unit through which the scanning beam projects, wherein at least a part of the forward portion of the head unit and a forward portion of the hilt are formed of an elastomeric material and have downwardly and upwardly facing grooves formed therein, respectively, and wherein the window is securely received within the grooves to form an environmental seal between the window and an interior of the head unit.

31. The scanner of claim 23, further comprising an endcap coupled to a free end of the handle, the endcap having an outwardly and circumferentially extending elastomeric portion, and wherein the hilt and circumferentially extending elastomeric portion of the endcap define a gripping region on the handle.

32. The scanner of claim 23, further comprising a mount for releasably holding the scanner therein, and having an upper surface for resting against an undersurface of the hilt.

33. The scanner of claim 23, further comprising an audible indicator unit having an upwardly and rearwardly projecting cone positioned within a rear portion of the head unit.

34. The scanner of claim 23, further comprising a visual indicator positioned at an upper and rear portion of the head unit.

* * * * *